April 6, 1965 R. E. MEYERS ETAL 3,177,092
VINYL-RESIN COATED CANS AND PROCESS
Filed June 26, 1961
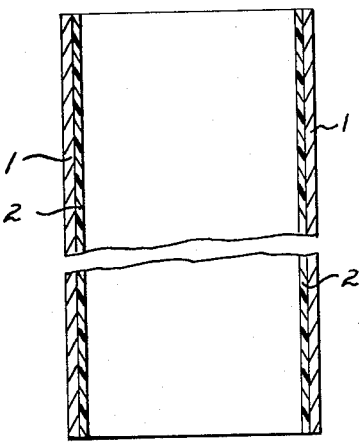
FIG. I
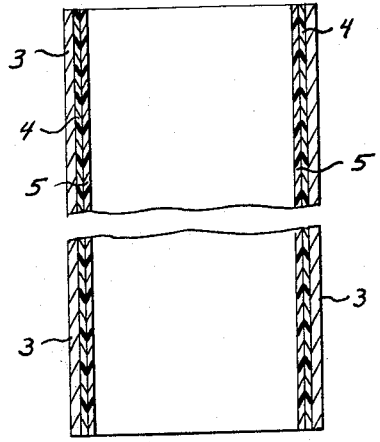
FIG. II
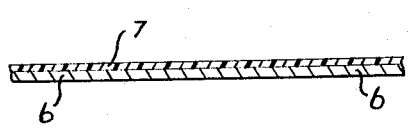
FIG. III
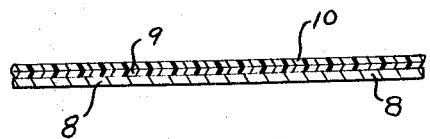
FIG. IV
RAYMOND E. MEYERS
EDGAR W. EUBANKS
INVENTORS
BY G.G. Christensen
ATTORNEY 3,177,092
VINYL-RESIN COATED CANS AND PROCESS
Raymond E. Meyers, North Riverside, and Edgar W. Eubanks, Chicago, Ill., assignors to The Glidden Company, Cleveland, Ohio, a corporation of Ohio
Filed June 26, 1961, Ser. No. 119,695
10 Claims. (Cl. 117—132)

This invention relates to coated metal cans and/or closures (lids, caps, etc.) for food containers, and to the process for preparing such and related coated metal articles. The invention relates more specifically to the use of certain neutral (i.e., non-acidic) vinyl chloride copolymer resins as the resinous solids of food-contacting linings, for such coated metal articles, which resins have heretofore been found to be unserviceable for such usage without addition of acidic resins. Such prior blended mixtures of neutral and acidic resins are disclosed in the copending application of Nusser and Good, Serial No. 858,819, filed November 30, 1959.

We have now discovered that the neutral copolymer resins of such neutral resin/acidic resin mixtures can be used alone to provide the sole resinous food-contacting film or lining on coated metal articles of the kinds referred to above, whether the said food-contacting film is applied over a resinous priming film carried on the metal substrate or is applied directly to the metallic surface of the substrate.

Food-contacting resinous films for cans, lids, etc. are tested carefully by can manufacturers to evaluate their qualities in respect to various conditions of use. The foremost testing procedures used to evaluate the merits of such linings are commonly identified by the terms "blush resistance," "adhesion" and "fracture." Blush-resistance is a qualitative measure of the resistance of the film to development of filmy, whitish spots in the film after the film has been in contact with various foods and/or beverages during a pasteurization treatment, and the quality is determined experimentally by means of a test simulating the exposure of the film to said foods when the latter are sterilized in the usual canning of said foods. The "adhesion" of the film to the substrate (whether it be a priming film or the metallic surface per se) is measured qualitatively by a pressure-sensitive tape test which is usually carried out on the film being tested after the aforementioned pasteurization test. The "fracture" measures the ability of a coated metal sheet to withstand the forming operations involved in fabricating the coated sheet into can bodies, can ends, jar lids, bottle caps and closures, etc. The fracture test is usually applied to a specimen of the coated sheet after subjecting the specimen or the coated sheet to the usual pasteurization treatment, but various forms of the test can be applied to the specimen prior to the said pasteurization treatment. As used herein, the "fracture" tests give results secured after pasteurization.

We have found that by our hereinafter-disclosed process of preparing and baking the subject vinyl chloride copolymer resins, we secure coated metal articles which successfully pass the can-maker's tests for "blush-resistance," "adhesion" and "fracture," and hence are acceptable for the prolonged exposures involved in packaging foods and beverages.

Accordingly one object of our invention is to provide novel coated metal articles having the form of sealed cans or having the form of flat sheets, of can bodies, of can ends, and/or of caps, lids, etc., said sealed cans and all of the latter forms being serviceable for use as or in containers intended to package foods and/or beverages with the resinous film in contact with the contents of the container.

Another object is to provide a novel process for preparing and baking coating compositions for metals, in which compositions the sole film-forming material consists of one or more of said neutral vinyl chloride copolymers and in which said film-forming material is dissolved in cooperating inexpensive organic solvents.

Other objects will be apparent from the following description of our invention taken in conjunction with the attached sheet of drawings in which all thickness dimensions are exaggerated for clarity and in which:

FIGURE I is a vertical sectional view of a metallic can body having a baked resinous lining directly carried on the inside surface of said can body;

FIGURE II is a vertical section of a metallic can body having both a baked resinous basecoat and a baked resinous topcoat forming a lining on the inside surface of said can body; and FIGURES III and IV are vertical sectional views of flat metal sheets carrying one and two baked linings respectively on a surface thereof, from which can ends can be stamped for closing the ends of the can bodies of FIGURES I and II respectively.

As pointed out above, the subject vinyl chloride copolymer resins have been used in the past as ingredients of can linings but only in combination with certain acidic resins. The latter had been found to be necessary in order to make the film adhere satisfactorily, and to improve its "fracture" resistance. The acidic resins, however, exhibit poor "blush-resistance" and hence tend to lower the blush-resistance of the whole mixed-copolymer film. It has therefore been desired to eliminate the acidic resins. To do this, however, has required the discovery of some way to improve the adhesion of the neutral resins per se to the substrate.

We have now found that satisfactory "adhesion," "blush-resistance" and "fracture" can be secured in baked films of the neutral resins by fusing the resin solids of the film before, during or after evaporation of the solvent component used to dissolve the resin solids in making the initial coating composition. Said fusion of the resin solids is accomplished (a) by baking the applied wet film of coating composition at temperatures within a certain critical range; namely, between 310° F. and 355° F., and (b) by using as the solvent component of the coating composition certain mixtures of solvents hereinafter identified.

The resin solids and the solvent component of our coating compositions will now be described under their separate headings.

THE RESIN SOLIDS

As will be understood, the resin solids of the coating compositions are composed entirely of neutral, thermoplastic, non-thermal-setting vinyl chloride copolymers. These copolymers can be formulated according to the requirements of either of the following two groups or classes:

CLASS A COPOLYMERS

| Monomer Component | Weight Percent Range | |
|---|---|---|
| | Maximum | Preferred |
| Vinyl chloride | 55–77 | 67–77 |
| Neutral diesters [1] | 45–23 | 33–23 |
| Optional relative viscosity modifier [2] (based on 100 parts of monomer) | 1.0–6.5 | 1.7–6.0 |
| Relative viscosity [3] | 1.26–1.60 | 1.30–1.50 |

CLASS B COPOLYMERS

| Monomer Component | Weight Percent Range | |
|---|---|---|
| | Maximum | Preferred |
| Vinyl chloride | 55–80 | 67–75 |
| Neutral diesters [1] | 3–23 | 6–20 |
| Neutral acrylic esters [4] | 1–22 | 6–20 |
| Optional relative viscosity modifier (based on 100 parts of monomer) | 1.0–6.5 | 1.7–6.0 |
| Relative viscosity [3] | 1.27–1.60 | 1.30–1.50 |

[1] These are diesters of $\alpha,\beta$ unsaturated dicarboxylic acids selected from the group consisting of maleic acid, chloromaleic acid and fumaric acid, each alcohol radical of said diesters being a hydrocarbon radical of 1–10 carbon atoms (e.g. alkyl, aryl, cycloalkyl, or alkaryl) substantially free of ethylenic unsaturation.
[2] The optional relative viscosity modifiers are described hereinafter under a corresponding main heading. The modifiers are optional because a heat treatment described hereinafter an be used in their stead to secure the indicated values of relative viscosity.
[3] The relative viscosity of the copolymers is determined at a 1.0 wt. percent level in cyclohexanone.
[4] The acrylic esters are alkyl esters of acrylic and/or methacrylic acids, each alkyl group thereof containing 6–12 carbon atoms.

It will be seen that the Class B copolymers are a modification of the Class A copolymers in which a part of the diester(s) of the latter is replaced and/or augmented with neutral alkyl ester(s) of acrylic and/or methacrylic acid(s).

Either of the Class A or Class B copolymers can be prepared from a single diester or from mixtures of two or more diesters. Likewise, the Class B copolymers can be made from a single acrylic-type monoester or from a mixture of two or more of such monoesters. Likewise mixtures of the Class A and Class B copolymers can be used.

In both classes of copolymer we prefer to have the unsaturated dicarboxylic acid of the diesters represented by a mixture of maleic and fumaric acids, with at least 50% by weight being fumaric acid. We also prefer to have the alcohol radicals of the diesters represented by the butyl radical, and we especially prefer the n-butyl radical. A commercial material offered as di-n-butyl maleate but actually containing approximately equal proportions of di-n-butyl maleate and di-n-butyl fumarate is especially useful in preparing our preferred copolymers.

The copolymers of this invention can be prepared by mixing together the several monomeric starting materials and subjecting them to any of the usual free-radical polymerization systems and conditions, for instance in solution in solvents, or in emulsion in aqueous media, using free-radical generating catalysts and conditions. In practical production, however, it will usually be preferred to polymerize these materials in suspension in aqueous media by the known suspension polymerization technique. In general this technique involves suspending the monomers in aqueous medium containing non-miscelleforming suspending agents. Suspending agents suitable for this purpose are hydrophilic high polymeric materials such as gelatin, polyvinyl alcohol, polyacrylic acid, polymaleic acid, methyl cellulose, and the like. The aqueous medium constitutes about at least half of the entire polymerization mass. The reaction is promoted by the presence of free-radical generating agents soluble in the monomer phase of the suspension, such as benzoyl peroxide, perbenzoic acid, p-chlorobenzyl peroxide, t-butyl hydroperoxide and the like. The aqueous phase and the monomer phase are agitated together so as to suspend the latter in the former, and the temperature of the mass is adjusted to values such as to initiate the polymerization reaction, usually on the order of 30°–100° C. The monomers in the suspended droplets become polymerized, yielding a suspension of granular resin in the aqueous medium. From this aqueous suspension the resin is isolated by filtration.

While 1.5–6.5% trichloroethylene is preferably employed in the preparation of our copolymers as the relative viscosity modifier (all as set forth in Reissue Patent 24,206, here incorporated by reference) equivalent results can be secured by either (a) omitting all chemical modifier(s) entirely and concomitantly polymerizing the mixture of starting materials at temperatures between 70° and 85° C., preferably 74°–77° C. (all as described in U.S. Patent 2,849,424, here incorporated by reference), (b) by replacing the trichloroethylene with 1–6.5% by wt. of halogenated unsaturated hydrocarbons of the class consisting of cis- and trans-1,2-dichloroethylene, cis- and trans-1,2-dibromo-ethylene, 1,1-dichloro-2-bromoethylen, allyl chloride, methallyl chloride, allyl bromide, allyl iodide, methallyl bromide, methallyl iodide, 2,3-dibromo-1-propene, 3,3-dichloro-1-propen, 2,3-dibromo-1-propene, 1-chloro-2-butene, 1-chloro-2,2-decene and 1-chloro-2-2-octadecene (all as disclosed in U.S. Patent 2,849,422, here incorporated by reference), or (c) by replacing the trichloroethylene with 1–6.5% by wt. of halogenated hydrocarbons containing up to 16 carbon atoms and containing up to 5 halogen atoms selected from the group consisting of fluorine, bromine and iodine. These are exemplified by the halogenated methanes, such as carbon tetrachloride, carbon tetrabromide, bromochlorodifluoromethane, bromoform, methyl chloride, methyl bromide, methyl iodide, chloroform, iodoform methylene dichloride, methylene dibromide and the like, halogenated ethanes such as ethyl chloride, 1,1,2-trichloroethane, 1,1,2,2-tetrachloroethane, ethylene chloride, ethylene bromide, ethyl bromide, ethyl iodide, 1,1,2-trichloro-2-fluoroethane, 1,1,2-tribromoethane, 1,1-dichloro-2-bromoethane, pentachloroethane and the like, and halogenated propanes and butanes, such as n-propyl chloride, n-propyl iodide, isopropyl chloride, isopropyl bromide, n-butyl chloride, 1,4-dichlorobutane, t-butyl chloride, and the like. Suitable higher halogenated hydrocarbons include for instance amyl chloride, dodecyl bromide, dodecyl iodide, the dichloropentanes, hexadecyl chloride and the like. The use of such halogenated hydrocarbons in place of trichloroethylene is disclosed in U.S. Patent 2,849,423, here incorporated by reference.

The exact function of the trichloroethylene or of the various compounds or mixtures thereof which can be used as relative viscosity modifiers to replace it in the polymerization process is not fully understood; possibly they act as chain terminators or transfer agents, or perhaps they affect the growing polymer chains in some manner not yet elucidated. At any rate polymers produced in the absence of such materials and outside of the temperature range of 70–85° C. do not possess the desirable properties which render our baked films appropriate for use as can linings. When the starting materials are either polymerized in the presence of such modifiers, or in the absence of such modifiers but within the temperature range of 70–85° C., the finished products are found to have relative viscosities (in 1% cyclohexanone solution) ranging between about 1.27 and 1.60 and more preferably between about 1.30 and 1.5.

If desired or necessary to remove the modifiers at the completion of the polymerization, this can be done by means of vacuum drying, solvent extraction or the like.

In connection with the four U.S. patents mentioned above and incorporated by reference, it should be noted that they disclose the preparation of only acidic copolymers. By omitting the acidic half-esters, and formulating within the ranges disclosed above, one can utilize all the teachings of said patents in preparing the neutral copolymers of the present invention.

THE SOLVENT COMPONENT

The neutral copolymers and/or blends of neutral copolymers of this invention can be made into coating compositions by using one or more solvent(s), i.e. solvent mixtures, which yield a homogeneous single-phase solution. However, the copolymers are soluble in low cost aromatic hydrocarbon solvents such as benzene, toluene, xylene, etc. in substantial proportions (e.g., up to 35% of copolymers, based on the total weight of the solution) and hence it is economically desirable to use major amounts of such solvents, i.e., 40-94% by weight, based on the total weight of solvents in the solvent component. Aliphatic hydrocarbon solvents (e.g., naphthas, mineral spirits, etc.) can be used along with such low cost aromatic solvents in amounts up to about 40% or can be omitted entirely. The solvent component must contain about 7-50% by weight of strong solvents identified below, but as noted hereafter, no one of such strong solvents should exceed 20% maximum nor certain indicated lesser preferred amounts. The class of strong solvents consists of identified ketones and nitropropane. After the foregoing percentage limitations have been observed in formulating the critical portion of solvent component, any remainedr can be composed of one or more of the following less-critical and optional solvents: alkanols of up to 4 carbons, lower (1-6 carbons) alkyl acetates, alkylene- and/or polyalkyleneglycol monoalkyl ether alcohols having up to 4 carbons in each alcohol radical, and/or (1-6 carbons) saturated aliphatic monocarboxylic acid esters of such ether alcohols.

Such mixtures of solvents give solutions (at 10-35% interpolymer solids dissolved therein) having useful viscosities. For container coating work, viscosities between about 13 and 75 seconds (No. 4 Ford Cup 20° C.) are desirable. The solvents identified above are easily released from the wet applied film during baking when they are present in amounts giving viscosities within the above range.

Aside from merely dissolving the resins releasable inert solvents, however, there is the matter of including small amounts of particular strong solvents of the class identified above, which solvents aid the fusion of the resin during the baking treatment. These solvents are listed below with an indication of the maximum permissible amount of any one solvent and the preferred ranges for the indicated application methods.

|  | Weight Percent of Any One Strong Solvent | | |
|---|---|---|---|
|  | Maximum [1] | Preferred for Roll Coating | Preferred for Spraying |
| Methyl ethyl ketone | 20 | 3-20 | 3-20 |
| Isophorone | 20 | 3-15 | 1-20 |
| 2-nitropropane | 20 | 3-20 | 3-20 |
| Methyl isobutyl ketone | 20 | 3-20 | 3-20 |
| Acetone | 20 | 2-5 | 2-6 |

[1] This limit is imposed mainly by overall cost and practical performance as keyed to present commercial can-coating methods and operations.

Particular solvent mixtures which we have found to be especially useful are the following:

*For roll-coating application of film*

| RC-A | RC-B | RC-C |
|---|---|---|
| 20% 2-nitropropane. 10% Isophorone. 70% Xylol. | 4% 2-nitropropane. 4% Isophorone. 92% Xylene. | 80% Xylene. 20% methyl ethyl ketone. |

| RC-D | RC-E | RC-F |
|---|---|---|
| 94% Xylene. 3% Isophorone. 3% 2-nitropropane. | 45% Xylene. 20% Hi-flash naphtha. 20% 2-nitropropane. 15% Isophorone. | 45% Xylene. 45% Solvesso 158.[1] 10% Isophorone. |

| RC-G | RC-H | RC-I |
|---|---|---|
| 45% Xylol. 20% Hi-flash naphtha. 20% Methyl isobutyl ketone. 15% Isophorone. | 40% Xylol. 40% Solvesso 158.[1] 5% Acetone. 15% Isophorone. | 75% Xylol. 10% Methyl isobutyl ketone. 10% Isophorone. 5% Ethyleneglycol monobutyl ether. |

| RC-J | RC-K | RC-L |
|---|---|---|
| 75% Xylol. 8% 2-nitropropane. 11% Isophorone. 6% Diethyleneglycol monomethyl ether. | 75% Xylol. 8% 2-nitropropane. 12% Isophorone. 5% Ethyleneglycol monomethyl ether acetate. | 75% Xylol. 8% 2-nitropropane. 12% Isophorone. 5% Diethyleneglycol monomethyl ether acetate. |

[1] Medium boiling range aromatic hydrocarbon solvent of Kauri Butanol value 87-90, specific gravity of .886-.8964 and refractive index at 25° C. of 1.1500. Initial boiling point 363-367° F.; 50% at 373°-380° F.; 95% at 390°-397° F. and end point at 404-425° F.

*For can-body spray application*

| S-A | S-B | S-C |
|---|---|---|
| 90% Toluol. 5% Acetone. 5% 2-nitropropane. | 93% Toluol. 4% Methyl isobutyl ketone. 3% Acetone. | 88% Toluol. 6% Acetone. 6% Methyl isobutyl ketone. |

| S-D | S-E |
|---|---|
| 84% Toluol. 6% Acetone 6% Methyl isobutyl ketone. 4% Isopropanol or butanol. | 84% Toluol. 6% Acetone. 3% Methyl ethyl ketone. 7% Ethyl acetate. |

OPTIONAL THERMAL STABILIZERS IN SOLVENT COMPONENT

The neutral copolymer(s) and/or blends thereof have good thermal stability (resistance to thermal breakdown) and hence can be baked at higher temperatures than vinyl chloride-vinyl acetate copolymers. Nevertheless, we have sometimes found it beneficial to include small amounts of non-film-forming 1,2-epoxy compounds as thermal stabilizers. Usually, amounts below 1% by weight on the film-forming solids are sufficient, preferably between 0.02% and 0.5%. Propylene oxide is our preferred stabilizer but other non-film-forming epoxides such as phenoxypropylene oxide, epichlorohydrin, ethylene oxide, diallyl ether monoxide and/or phenyl glycidyl ether can be used as well. When the compositions are processed and stored in glass or equivalent inert containers, the 1,2-epoxy compound(s) can be omitted.

APPLICATION AND BAKING OF COATINGS

The coating compositions (either clear or pigmented as desired) used in practicing the invention can be applied to surfaces of formed containers and closures or to sheet stock from which containers and/or closures are to be fabricated by any of the usual means, such application being for example by roller coating, spraying, knifing, etc. The compositions can be adapted particularly for roller coating since the solvency characteristics of the film-forming materials permit the use of solvent mixtures which have little or no harmful effects on the resilient material of the rollers such as ketones and other strong solvents of prior can coatings have. Our coatings are also advantageous in respect to any of the conventional application methods since their higher resinous solids contents permit thicker baked films to be secured per layer of applied wet film. This permits an increased rate of production per applied unit of baked film thickness, and this latter benefit is accompanied with lower lost-solvent charges. This reduction in solvent charges can be of the order of 65% based on present costs of solvents in ketone-soluble vinyl chloride/vinyl acetate sanitary coatings, thereby saving as much as 17 cents per pound of applied resin.

To secure fusion, film-continuity and adhesion of the resin solids of the applied coating composition, aided by the particular solvents named above, the metal article with its applied wet coating is baked at temperatures between 310° F. and 355° F. for periods of 6–11 minutes. Thermal decomposition of the resin solids at these temperatures is prevented, apparently by obscure functioning of the said fusion-aiding solvents. As pointed out above, however, 1,2 epoxy compounds can be included in the coating composition to further ensure absence of thermal decomposition or degradation in color of the finished, baked film.

While sanitary can lining coatings are usually unpigmented, linings for detergent cans or other cans can desirably be pigmented. Likewise where our coatings are used in other non-sanitary coating uses, pigmentation is frequently desired. Any of the conventional inorganic and/or metallic pigments can be used with or without conventional filler and/or extender pigments. Any desired quantity of total pigmentary material can be used, so as to achieve flat, semi-glossy and/or glossy baked films.

While the baked films secured through the practice of this invention can be applied to any substrate which is not harmed by the baking treatment, such as glass, ceramics, glass fibers, cement products, asbestos-cement products, etc., the invention is directed more particularly to the coating of metals of the kinds conventionally used in making cans or food-contacting metal components of containers for foods and beverages, such as aluminum, can-maker's-quality black iron, tin-plated iron, terne plate, chromated (HINAC) black plate, etc. As pointed out above, such metals can be coated directly with our coating composition or they can carry a priming- or basecoat on which our coating compositions are applied to provide a food-contacting topcoat. The can industry presently favors the use of basecoats in connection with containers intended to receive certain foods and beverages, and presently approves the use of certain oleoresinous, epoxy and/or butadiene/styrene copolymer basecoats. The latter are described fully in U.S. Patent 2,652,342, and the former are well known in the can-coating industry.

The following formulations are used in the examples hereof and are representative of currently-used basecoats.

BASECOAT A (OLEORESINOUS)

This is an 11 gallon oil length rosin/bodied linseed-bodied tung/unbodied tung oil varnish in hydrocarbon solvents at 52% non-volatile matter and containing 60 p.p.m. of manganese naphthenate drier with 120 p.p.m. of iron octoate drier; viscosity 50″–60″ at 80° F. (No. 4 Ford Cup); 7.9 lbs./gallon. Applied films are baked 10 minutes at 410° F.

BASECOAT B (HYDROCARBON COPOLYMER DRYING OIL)

This is a sodium-polymerized butadiene 80%/styrene 20% copolymer drying oil made in accordance with Run A of U.S. Patent 2,652,342, then modified with maleic anhydride as per Run O of said patent and finally modified further with aluminum di(ethylacetoacetate) monolinoleate and ethyl acetoacetate to secure a final formulation corresponding to that of Example 13 of copending application Serial No. 818,514, filed June 8, 1959, now Patent 3,080,246, whose disclosure is here incorporated by reference. The applied composition is baked 10 minutes at 410° F.

BASECOAT C (EPOXY RESIN/UREA/FORMALDEHYDE RESIN BLEND)

This is a basecoat formulated as follows:

| | |
|---|---|
| Epoxy resin[1] _____lbs__ | 10 |
| Butylated urea/formaldehyde resin solution (50% solids in 22 parts butanol and 28 parts xylol) _____gals__ | 1¼₁₆ |
| Ethyleneglycol monoethyl ether acetate ____gals__ | 1⁷⁄₁₆ |
| Diacetone alcohol _____gals__ | 1⁷⁄₁₆ |

[1] An epichlorhydrin/bisphenol epoxy resin having an epoxy equivalent of 1600–1900 and having an hydroxyl equivalent of 190; melting point is 117–135° C.

Applied film is baked 10 minutes at 410° F.

Referring now to the attached sheet of drawings it will there be seen that FIGURE I illustrates a metallic can body 1 the inside surface of which carries a baked resinous lining 2 composed of the resin(s) described above. FIGURE II illustrates a metallic can body 3 having as an inside lining thereon a baked basecoat 4 and a baked topcoat 5, the latter being composed of the resin(s) described above. FIGURE III illustrates a flat metal sheet having a baked lining 7 adhered directly to one face thereof, while FIGURE IV illustrates a flat metal sheet 8 having a baked basecoat 9 and a baked topcoat 10 carried on one face thereof. It will be understood from what has been said above that topcoats 7 and 10 of FIGURES III and IV respectively are composed of the resin(s) described hereinabove as laid down from the organic solvent solutions also described above. It will also be understood that the coated sheets of FIGURES III and IV can be used to provide can ends for the can bodies of FIGURES I and/or II.

The following examples illustrate the principles of our invention and include the best modes presently known to us for practicing those principles. It will be recognized from the foregoing description of our invention that the problem facing use was that of finding a way to manipulate our neutral copolymer resin solids, when used as the sole film-forming component of solvent-type coating compositions, so as to secure a baked film meeting the required standards of protection for metallic food and beverage containers or metallic components of the latter.

The following examples illustrate, by conventional test results, that our baked films meet said standards.

The tests referred to in the examples are carried out in the following manner.

A. A flat sheet of the coated can stock is placed in a punch press and three standard can ends are punched out. The punching operation is effected by means of a pair of dies which not only shear the desired disc from the sheet but which also draw the stock into the conventional form wherein several spaced-apart concentric shallow, circular ribs are formed in the disc. The formation of said ribs is a necessary part of the test, since the drawing operation subjects the test film to heavy pressure while also deforming and stretching it. The ability of the test film to undergo this forming operation without cracking or otherwise failing is revealed by the "Fracture Test" described below.

B. Three standard cans are filled with water and one of the test ends is crimped to each to seal the water within.

C. The three cans are then placed in a thermocouple-controlled tank of water which has already been heated to and stabilized at 150° F. (or 170° F. in some instances) with the test end of each can down. The cans are allowed to remain in the 150° F. water for 30 minutes (or 15 minutes in the case of the 170° F. test), after which they are removed and allowed to stand test-end down overnight (16–17 hours).

D. Each can is opened on a common household type rotary can opener, by cutting out the non-test end of the can. Then the water is poured out.

E. The opened cans with their test ends in place are then partially filled with a standard copper sulfate solution and allowed to stand for two hours, thereby to permit the copper sulfate to work on the test end.

F. Then the copper sulfate is poured out and the can is rinsed with water. Then the test end of each can is cut out on the said can-opener and is allowed to dry.

G. Commercial pressure-sensitive ("Scotch" brand) tape (½" wide) is applied to the test film of each test end and quickly pulled off. The amount of film removed from each test end is then evaluated on a scale of 0 to 10, zero representing no removal and 10 representing full removal. This is the "Adhesion" test.

H. Each can end is then evaluated for "Fracture" by examining the test end from the test film side. Any copper sulfate which has worked its way through the test film to the metal leaves a blackish residue at the point of contact with the metal. If no such residue is observed the "Fracture" rating is zero. If a large number of sites of residue is seen, the rating is 10.

I. Each can end is also examined for the presence of cloudy whitish areas of discoloration in the test film, called areas of "blush." If no such areas or spots are seen the rating for "blush resistance" is zero. If substantially the whole end is covered with such areas, the rating is 10.

THE WEDGE BEND TEST

The apparatus for this test consists of a heavy steel base or die carrying a vertical track on which slides a flat-faced weight having a weight of 2.3 kilograms. The upper face of the base has a beveled slot machined into it, one edge of the slot being flush with the said upper face and the other edge being recessed below the face about .020". The slot has a flat bottom which extends between said edges. Thus the base constitutes a die in which a metal sample can be deformed from a flat sheet into a sheet having a controlled rate of bevel or taper in a test portion thereof. The weight is raised to a height of 29" above the upper face of the base and is allowed to drop from there.

In the test a metal specimen having the desired test coating thereon is placed flatwise in the slot of the base, with the test coating uppermost. The weight is then dropped on it. The specimen is then removed and examined. If the coating lacks adequate flexibility it will fracture, with the fracturing beginning at the thin edge of the tapered portion. The evaluation of the test film is made by assessing the ratio of the width of the fractured area to the total width of the specimen. If the specimen is 1 inch wide and the coating fractures over an area of one-quarter inch from the thin edge of the tapered portion, then the rating is 25% failure. This is a severe test for flexibility under impact.

Example 1

A coating composition having the following formulation was prepared from the following materials:

| | Percent by wt. |
|---|---|
| Class A copolymer resin [1] | 25 |
| Xylene | 69 |
| Isophorone | 3 |
| 2-nitropropane | 3 |

[1] A resin prepared by emulsion-polymerization from 76.3% vinyl chloride and 23.7% commercial di-n-butyl maleate (containing 40–50% di-n-butyl fumarate) with 2.9% trichloroethylene. The monomers were polymerized in accordance with Example 1 of Reissue Patent No. 24,206 except for the indicated changes in monomer proportions. Relative viscosity 1.35.

The resin was dissolved in the solvents at ambient room temperatures and then was roller-coated at 6–7 mgs. per square inch over sheet iron can stock previously coated with olecresinous basecoat A, supra. The coated sheet was baked for 10 minutes at 350° F.

Can ends were formed and tested by the testing procedure described above wherein the pasteurization treatment was 30 minutes at 150° F. The results of the tests were as follow:

| | |
|---|---|
| Blush resistance | Good (1–2). |
| Adhesion | Fair (3–4). |
| Fractures | Do. |

Example 2

A coating composition was prepared from the following materials:

| | Percent by wt. |
|---|---|
| Class B copolymer resin [1] | 20.0 |
| Toluene | 74.4 |
| Methyl isobutyl ketone | 3.2 |
| Acetone | 2.4 |

[1] A resin prepared in accordance with Example 1 of Reissue Patent No. 24,206 except that the monomers and their proportions were: vinyl chloride 75%; commercial di-n-butyl maleate 13%; 2-ethylhexyl acrylate 12%; trichloroethylene 1.7% on 100 parts of monomers. Relative viscosity 1.32–1.38.

The resin was dissolved in the solvent mixture at room temperature and then the resulting solution was applied by draw-down bar at 6–7 mg. per square inch to a piece of the base-coated sheet of Example 1. The coated sheet was then baked 11 minutes at 310° F.

The results of tests carried out as described hereinabove after pasteurizing 30 minutes at 150° F. were as follow:

| | |
|---|---|
| Blush resistance | Fair (3–4). |
| Adhesion | Do. |
| Fracture | Do. |

Example 3

A coating composition was prepared in the manner of Example 1 from the following materials:

| | Percent by wt. |
|---|---|
| Class A resin of Example 1 | 25.0 |
| Toluene | 37.5 |
| Methyl isobutyl ketone | 11.3 |
| Methyl ethyl ketone | 26.2 |

The coating composition was applied at 4.5 mgs. per square inch on a portion of the base-coated can stock of Example 1, and then the coated sheet was baked 11 minutes at 310° F. The results of tests carried out in the manner described above on can ends formed from the coated sheet and pasteurized 30 minutes at 150° F. were as follow:

Blush resistance _____ Good (1–2).
Adhesion _____ Fair (3–4).
Fracture _____ Do.

*Example 4*

A coating composition was prepared in the manner of Example 1 from the following materials:

| | Percent by wt. |
|---|---|
| Class A resin of Example 1 | 20.0 |
| Xylene | 73.6 |
| 2-nitropropane | 3.2 |
| Isophorone | 3.2 |

The coating composition was applied by roller coater at 5–6 mgs. per square inch to (a) bare electroplated tin on sheet-iron can stock and (b) to a portion of the base-coated sheet can stock of Example 1. The coated sheets were baked 10 minutes at 340° F. Can ends were tested in the manner described above with a pasteurization of 30 minutes at 150° F. and then were evaluated as follows:

| | On Bare Tin | On Basecoat |
|---|---|---|
| Blush resistance | Good (1–2) | Good (1–2). |
| Adhesion | Excellent (0–1) | Good (1–2). |
| Fracture | Fair (3–4) | Fair (3–4). |

*Example 5*

A coating composition comparable with that of Example 2 was prepared in like manner by substituting an equal weight of the Class A copolymer resin of Example 1 for the Class B copolymer resin of Example 2. The coating composition was roller coated at 5–6 mgs. per square inch on the bare tin plate and base-coated stocks of Example 4, and then the coated sheets were baked 11 minutes at 310° F. Can ends formed from the coated sheets were tested in the described manner with pasteurization for 30 minutes at 150° F. and then were evaluated with the following results:

| | On Bare Tin | On Basecoat |
|---|---|---|
| Blush resistance | Good (1–2) | Good (1–2). |
| Adhesion | Excellent (0–1) | Good (1–2). |
| Fracture | Fair (3–4) | Fair (3–4). |
| Wedge Bend Rating | Good | |

*Example 6*

Tests comparable to those set forth in Example 5 were carried out except that half of the Class B copolymer of Example 2 was replaced with an equal weight of the Class A copolymer of Example 1, thereby to secure a 50/50 mixture of the two classes of resin. The results of the tests so carried out were substantial duplicates of the results set forth in Examples 4 and 5.

*Example 7*

When the tests of Example 4 were duplicated except for replacing the Class A resin thereof with Class A resins made from the same kinds and proportions of monomer but otherwise emulsion polymerized in accordance with Example 1 of U.S. Patent 2,849,422, thereby to provide four comparable resins, the results secured from said four resins duplicated substantially the results set forth in Example 4.

*Example 8*

In like manner, the tests of Example 4 were carried out using the four resins secured from the monomers of Example 2 by emulsion polymerizing them in accordance with Example 1 of U.S. 2,849,422. Again the results of the four tests were substantial duplicates of the results set forth in Examples 4 and 5.

*Example 9*

Seven resins prepared from the kinds and proportions of reactive monomers employed in the resin of Example 2 were prepared by emulsion-polymerization carried out in the manner described in Example 1 of U.S. 2,849,423. The resulting seven resins were tested in the manner described in Example 5, with substantially identical results.

*Example 10*

When the reactive monomers of Examples 1 and 2 were separately emulsion-polymerized and heat-treated in accordance with Example 1 of U.S. 2,829,424 and the resulting two resins were tested in manners described in Examples 4 and 5 hereof, respectively, the test results were substantially identical with those set forth in Examples 4 and 5.

*Example 11*

The following kinds and proportions of monomers were made into Class A resins by emulsion-polymerizing same in the manner described in Example 1 of Re. 24,206:

| | Monomer Mixtures (Percent by Wt.) | | |
|---|---|---|---|
| Vinyl chloride | 55 | 75 | 65 |
| Di-cyclohexyl chloromaleate | | 20 | |
| Di-n-butyl maleate/fumarate | 45 | 5 | 35 |
| Trichloroethylene (on 100 parts of monomer) | 3 | 3 | 3 |

The resulting three resins were made into and tested as can coatings in the manner described in Example 4, with results for each substantially duplicating the results set forth in Example 4.

*Example 12*

The following kinds and proportions of monomers were made into Class B resins by emulsion-polymerizing same in the manner described in Example 1 of Re. 24,206:

| | Monomer Mixtures (Percent by Wt.) | | |
|---|---|---|---|
| Di-n-butyl maleate/fumarate | 20 | 20 | 5 |
| 2-Ethyl hexyl acrylate | 5 | 5 | 20 |
| Vinyl chloride | 60 | 75 | 75 |
| 2-Ethyl hexyl methacrylate | 15 | | |
| Trichloroethylene (on 100 parts of monomer) | 1.7 | 1.7 | 1.7 |

The three resulting resins were made into and tested as can coatings in the manner described in Example 5, with results for each substantially duplicating the results set forth in Example 5.

Having described our invention, what we claim is:

1. A coated metal article having an exposed surface film thereon adapted for non-injurious prolonged contact with foods and beverages, said surface film being continuous and pore-free through (a) fusion of the resinous solids laid down in an applied organic solvent solution of said solids and (b) evaporation of the solvent component of said organic solvent solution, in a baking treatment of the applied wet film for 6–11 minutes at 310° F.–355° F., the resinous solids of said solution consisting essentially of neutral copolymer material having a relative viscosity of 1.27–1.60 as measured in a 1% cyclohexanone solution and selected from the group consisting of copolymers prepared from the monomers listed in formulations A and B below, and mixtures of said copolymers:

Formulation A:                                 Wt. percent
    Vinyl chloride _____ 55–77
    Neutral diesters of α,β unsaturated dicarboxylic acids selected from the group consisting of maleic acid, chloromaleic acid and fumaric acid, each alcohol radical of said diesters being a hydrocarbon radical of 1–10 carbon atoms substantially free of ethylenic unsaturation _____ 45–23

Formulation B: Wt. percent
- Vinyl chloride _____ 55–80
- Neutral diesters as defined in Formulation A above _____ 3–23
- Neutral alkyl esters of an α,β unsaturated monocarboxylic acid selected from the group consisting of acrylic acid and methacrylic acid, each alkyl group thereof containing 6–12 carbon atoms _____ 1–22 said solvent component consisting of (a) 7–50% by weight in toto of at least one strong solvent selected from the group consisting of methyl ethyl ketone, methyl isobutyl ketone, acetone, isophorone and 2-nitropropane, with any one of said strong solvents amounting to a maximum of 20%; (b) 40–94% by weight of at least one liquid aromatic hydrocarbon solvent, and (c) any remainder being selected from the group consisting of liquid aliphatic hydrocarbon solvents, alkanols having up to 4 carbon atoms; lower alkyl esters of acetic acid, alkylene glycol monoalkyl ether alcohols having up to 4 carbon atoms in each alcohol radical thereof, 1–6 carbon saturated aliphatic monocarboxylic acid esters of the latter ether alcohols, polyalkylene glycol monoalkyl ether alcohols having up to 4 carbon atoms in each alcohol radical thereof, 1–6 carbon saturated aliphatic monocarboxylic acid esters of the latter ether alcohols, and mixtures of the foregoing solvents.

2. The method of preparing a coated metal article having an exposed film thereon adapted for non-injurious prolonged contact with foods and beverages, said film being continuous and pore-free, which method comprises the steps of: dissolving at least one copolymer resin selected from the group consisting of Formulations A and B identified below in a solvent component consisting of (a) 7–50% by weight, in toto, of at least one strong solvent selected from the group consisting of methyl ethyl ketone, methyl isobutyl ketone, acetone, isophorone and 2-nitropropane, with any one of said strong solvents amounting to a maximum of 20%; (b) 40–94% by weight of at least one liquid aromatic hydrocarbon solvent and (c) any remainder being selected from the group consisting of liquid aliphatic hydrocarbon solvents, alkanols having up to 4 carbon atoms, lower alkyl esters of acetic acid, alkylene glycol monoalkyl ether alcohols having up to 4 carbon atoms in each alcohol radical thereof, 1–6 carbon saturated aliphatic monocarboxylic acid esters of the latter ether alcohols, polyalkylene glycol monoalkyl ether alcohols having up to 4 carbon atoms in each alcohol radical thereof, 1–6 carbon saturated aliphatic monocarboxylic acid esters of the latter ether alcohols, and mixtures of the foregoing solvents; applying said solution as a coating to a metallic substrate selected from the group consisting of bare metal and prime-coated metal; and baking said coated substrate for 6–11 minutes at 310°–355° F.; said copolymer resins being selected from the group consisting of Formulations A and B below and being substantially neutral copolymer resins having a relative viscosity of 1.27–1.60 as measured in a 1% cyclohexanone solution, the formulations being as follows.

Formulation A: Wt. percent
- Vinyl chloride _____ 55–77
- Neutral diesters of α,β unsaturated dicarboxylic acids selected from the group consisting of maleic acid, chloromaleic acid and fumaric acid, each alcohol radical of said diesters being a hydrocarbon radical of 1–10 carbon atoms substantially free of ethylenic unsaturation _____ 45–23

Formulation B: Wt. percent
- Vinyl chloride _____ 55–80
- Neutral diesters as defined in Formulation A above _____ 3–23

Formulation B: Wt. percent
- Neutral alkyl esters of an α,β unsaturated monocarboxylic acid selected from the group consisting of acrylic acid and methacrylic acid, each alkyl group thereof containing 6–12 carbon atoms _____ 1–22

3. The method as claimed in claim 2 wherein the copolymer resin is of the Formulation A type and wherein the monomers are employed in the following ranges of percentage, by weight: vinyl chloride 67–77%, neutral diesters 45–23%.

4. The method as claimed in claim 3 wherein said vinyl chloride amounts to about 76% and said neutral diesters consist of di-n-butyl maleate/fumarate mixed esters in an amount of about 24%, and wherein said copolymer has a relative viscosity of about 1.35.

5. The method as claimed in claim 4 wherein the solvent solution of copolymer resin is applied by roll-coating, and wherein each individual strong solvent of the strong solvent group is restricted to the following indicated range of amount:

| | Percent |
|---|---|
| Methyl ethyl ketone | 3–20 |
| Isophorone | 3–15 |
| 2-nitropropane | 3–20 |
| Methyl isobutyl ketone | 3–20 |
| Acetone | 2–5 |

6. The method as claimed in claim 4 wherein the solvent solution of copolymer resin is applied by spraying, and wherein each individual strong solvent of the strong solvent group is restricted to the following indicated range of amount:

| | Percent |
|---|---|
| Methyl ethyl ketone | 3–20 |
| Isophorone | 1–20 |
| 2-nitropropane | 3–20 |
| Methyl isobutyl ketone | 3–20 |
| Acetone | 2–6 |

7. The method as claimed in claim 2 wherein the copolymer resin is of the Formulation B type and wherein the monomers are employed in the following ranges of percentage, by weight: vinyl chloride 67–75%, neutral diesters 6–20%, and neutral acrylic esters 6–20%.

8. The method as claimed in claim 7 wherein the vinyl chloride amounts to about 75%, wherein the neutral diesters amount to about 13% and consist essentially of di-n-butyl maleate/fumarate mixed esters, wherein the neutral acrylic esters amount to about 12% and consist of 2-ethyl hexyl acrylate, and wherein the relative viscosity of the copolymer is about 1.32–1.38.

9. The method as claimed in claim 8 wherein the solvent solution of copolymer resin is applied by roll-coating, and wherein each individual strong solvent of the strong solvent group is restricted to the following indicated range of amount:

| | Percent |
|---|---|
| Methyl ethyl ketone | 3–20 |
| Isophorone | 3–15 |
| 2-nitropropane | 3–20 |
| Methyl isobutyl ketone | 3–20 |
| Acetone | 2–5 |

10. The method as claimed in claim 8 wherein the solvent solution of copolymer resin is applied by spraying, and wherein each individual strong solvent of the strong solvent group is restricted to the following indicated range of amount:

| | Percent |
|---|---|
| Methyl ethyl ketone | 3–20 |
| Isophorone | 1–20 |
| 2-nitropropane | 3–20 |
| Methyl isobutyl ketone | 3–20 |
| Acetone | 2–6 |

(References on following page)

References Cited by the Examiner

UNITED STATES PATENTS

| | | | |
|---|---|---|---|
| Re. 24,206 | 8/56 | Rowland et al. | 260—78.5 |
| 2,941,974 | 6/60 | Reymann et al. | 117—132 XR |
| 2,979,480 | 4/61 | Piloni et al. | 260—78.5 XR |
| 3,050,412 | 8/62 | Coe | 117—132 XR |

OTHER REFERENCES

Serial No. 397,138, Fikentscher et al. (A.P.C.), published May 11, 1943.

WILLIAM D. MARTIN, *Primary Examiner.*

RICHARD D. NEVIUS, *Examiner.*